United States Patent [19]

McAuliffe, Jr. et al.

[11] Patent Number: 5,009,390

[45] Date of Patent: Apr. 23, 1991

[54] ELECTROMAGNET AND REED-TYPE VALVE ASSEMBLY

[75] Inventors: Lawrence McAuliffe, Jr., Ann Arbor; Sidney D. Hardy, Sterling Heights, both of Mich.

[73] Assignee: Coltec Industries Inc., New York, N.Y.

[21] Appl. No.: 486,991

[22] Filed: Mar. 1, 1990

[51] Int. Cl.⁵ .............................................. F16K 31/06

[52] U.S. Cl. ............................ 251/129.2; 251/129.21

[58] Field of Search ......................... 251/292.21, 129.2

[56] References Cited

U.S. PATENT DOCUMENTS

| | | | |
|---|---|---|---|
| 2,831,649 | 4/1958 | Hayslett | 251/129.2 X |
| 3,211,417 | 10/1965 | Ray | 251/129.2 |
| 4,114,852 | 9/1978 | Fournier | 251/129.2 |
| 4,585,174 | 4/1986 | Knapp | 251/129.2 X |

*Primary Examiner*—Arnold Rosenthal

*Attorney, Agent, or Firm*—Howard S. Reiter

[57] ABSTRACT

A fuel injection fuel supply system for a combustion engine has a fuel injector valve assembly effective for metering and injecting metered fuel into the engine induction system; the valve assembly is shown having a plurality of reed-like valving members each of which is opened and closed in response to the energization and de-energization of an electrical field generating coil which is a part of the injector valve assembly.

28 Claims, 5 Drawing Sheets

ELECTROMAGNET AND REED-TYPE VALVE ASSEMBLY

FIELD OF THE INVENTION

This invention relates generally to liquid metering systems, as for example a fuel metering system for a combustion engine, and more particularly to the valving means employed within such a liquid metering system and, further, with still greater particularity to an electromagnetically operated metering and valving means.

BACKGROUND OF THE INVENTION

Various types of electromagnetic fuel injectors are known in the art. Generally, such injectors contain an electromagnetic coil which, when energized is operative to effect axial movement of an armature. In such prior art arrangements, the armature itself may be the valving member or it may be mechanically connected to a valve member that is movable relative to a valve seat for controlling fuel injection.

Such prior art injectors normally require very close manufacturing tolerances to obtain concentricity of parts for effecting proper seating of the valve, for proper stroke length of the armature and to obtain other desired structural relationships effecting fuel metering, fuel spray patterns and the durability of the injector.

The invention as herein disclosed and described is primarily directed to the solution of the aforestated and other related and attendant problems of the prior art.

SUMMARY OF THE INVENTION

According to one aspect of the invention, a valving assembly for variably restricting fluid flow, comprises housing means, electrical field coil means for creating a magnetic field flux, wherein said field coil means comprises a cross-sectional longitudinal axis, pole piece means, a valve seat, fluid flow passage means formed through said valve seat, a movable valve, armature means, and resilient means normally operatively resiliently urging said valve toward operative seating engagement with said valve seat as to thereby terminate flow of said fluid through said fluid flow passage means, wherein said electrical field coil means upon being energized is effective to create said magnetic field flux and cause said armature means to move said valve in a direction away from said valve seat to thereby permit flow of said fluid through said fluid flow passage means, and wherein as said valve moves in said direction away from said valve seat said valve is moving in a direction generally transverse to said cross-sectional longitudinal axis.

Various general and specific objects, advantages and aspects of the invention will become apparent when reference is made to the following detailed description considered in conjunction with the accompanying drawings.

BRIEF DESCRIPTION OF THE DRAWINGS

In the drawings, wherein for purposes of clarity certain details and/or elements may be omitted from one or more views.

DETAILED DESCRIPTION OF THE PREFERRED EMBODIMENT OF THE INVENTION

Figure 1:
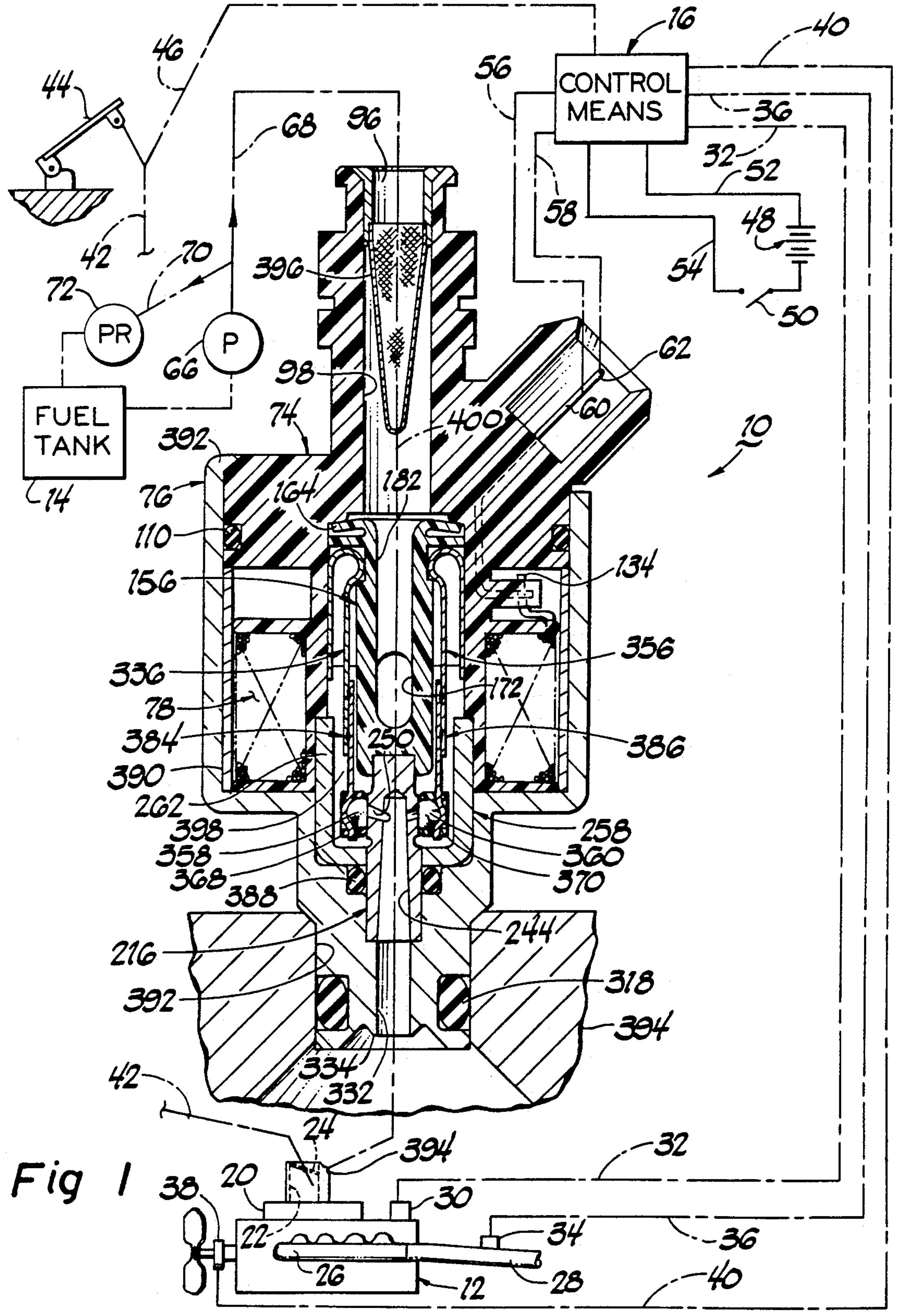
FIG. 1 is a view of a fuel metering assembly, employing teachings of the invention, along with both diagrammatically and schematically illustrated elements and components depicting, in simplified manner, an overall fuel supply and metering system for an associated combustion engine, with said fuel metering assembly being illustrated in relatively enlarged scale and in axial cross-section.
Figure 2:
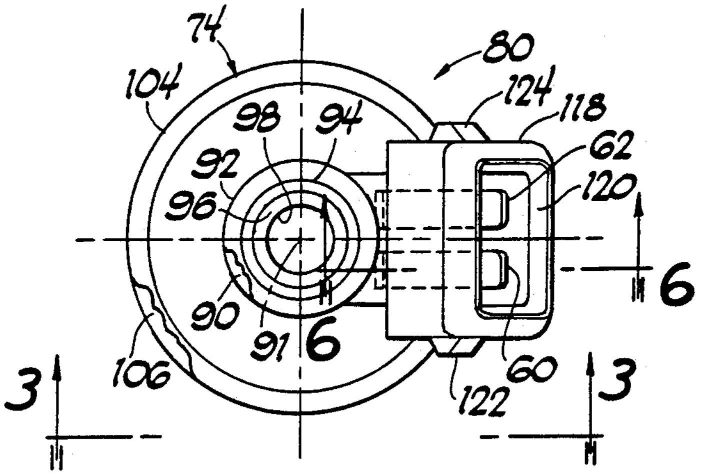
FIG. 2 is a top plan view, in relatively reduced scale, of one of the sub-assemblies shown in FIG. 1.
Figure 6:
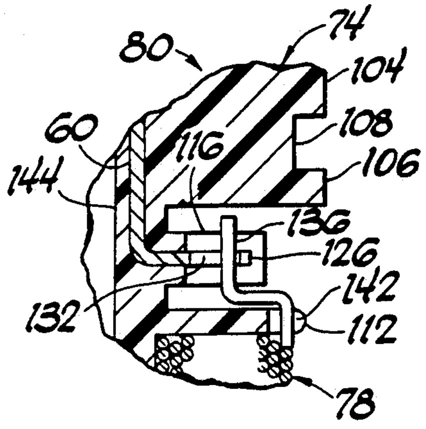
FIG. 6 is a relatively enlarged cross-sectional view of a fragmentary portion of the structure of FIG. 3 taken generally on the plane of line 6—6 of FIG. 2 and looking in the direction of the arrows.
Figure 4:
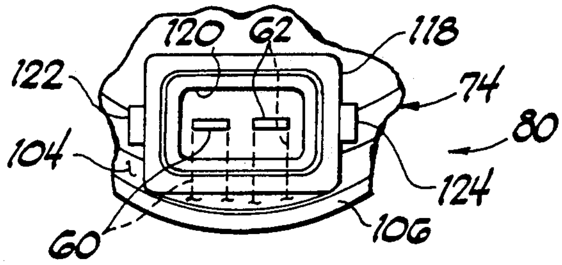
FIG. 4 is a view of a fragmentary portion of the sub-assembly of FIG. 3 taken generally on the plane of line 4—4 and looking in the direction of the arrows.

Referring now in greater detail to the drawings, FIG. 1 illustrates a fuel metering and delivery apparatus or system 10, a combustion engine 12, a fuel reservoir or fuel tank 14 and an associated control means 16.

The engine 12 may be provided with a manifold-like induction passage means 20 which communicates with the ambient atmosphere as by induction passage means 22 having a pivotally mounted and manually positionable throttle valve means 24 therein. An air intake cleaner, not shown but well known in the art, may be operatively connected to the intake end of induction passage means 22. The induction manifold or passage means 20 serves to communicate with the respective intake port means of the respective engine cylinders. An engine exhaust manifold 26 communicates with the respective exhaust port means of the respective engine cylinders and with an engine exhaust pipe or conduit 28 which discharges the engine exhaust to ambient.

The control means 16 may comprise, for example, suitable electronic logic type control and power output means effective to receive one or more parameter type input signals and in response thereto produce related outputs. For example, engine temperature responsive transducer means 30 may provide a signal via transmission means 32 to control means 16 indicative of the engine temperature: sensor means 34 may sense the relative oxygen content of the engine exhaust gases (as within engine exhaust conduit means 28) and provide a signal indicative thereof via transmission means 36 to control means 16; engine speed responsive transducer means 38 may provide a signal indicative of engine speed via transmission means 40 to control means 16 while engine load, as indicated for example by the position of the engine induction system throttle valve means 24, may provide a signal as via transmission means 42 operatively connected to an engine operator's foot-actuated throttle pedal lever 44 and operatively connected as by the same transmission means or associated transmission means 46 to control means 16. A source of electrical potential 48 along with related switch means 50 may be electrically connected as by conductor means 52 and 54 to control means 16. The output terminals of control means 16 are respectively electrically connected as via conductor means 56 and 58 to electrical terminals or conductors 60 and 62, of the metering means 10, which in turn are electrically connected to opposite electrical ends of an associated electrical field generating coil means.

The fuel tank or reservoir means 14 supplies fuel to associated fuel pump means 66 (which may be situated internally of the reservoir means 14) which, in turn, supplies fuel at a superatmospheric pressure via conduit means 68 to the inlet of the metering appartus or means 10. A return conduit means 70 and pressure regulating means 72 serve to return excess fuel to an area upstream of the pump 66 as, for example, to the fuel reservoir means 14.

The valving or injector assembly 10 is illustrated as comprising a generally inner housing or body 74 of non-magnetic material, preferably of nylon or other suitable plastic material, an outer generally tubular housing 76 of magnetic material, preferably of steel, and a magnetic field generating electrical coil 78.

Referring in greater detail to FIGS. 2, 3, 4, 5 and 6 wherein body 74, coil 78 and other elements to be described may collectively be considered as a sub-assembly 80, the body 74 is depicted as comprising a generally upper body portion 82, a generally mid-body portion 84 and a generally lower body portion 86. As shown in both FIGS. 2 and 3, it can be seen that the entire housing or body 74 is generally cylindrical.

The upper body portion 82 is depicted as comprising a generally cylindrical body 88 having axially spaced annular flanges 90 and 92. The upper end is preferably formed with a flange 94 and the annular space generally between flanges 94 and 92 may be provided with a fluid seal, such as an O-ring (not shown), while flanges 90 and 92 may be employed for operative connection to related coupling or connector means for operative joining of the fuel supply conduit mean 68 thereto for communication with an inlet 96 of a conduit or passage 98 formed axially through body portion 82 and partly into the mid-body portion 84.

The mid-body portion 84 is illustrated as comprising an upper and lower cylindrical body portions 100 and 102 respectively having outer cylindrical surfaces 104 and 106, preferably of like diameter, which are axially spaced by an annular groove or recess 108 effective for receiving a suitable seal such as an O-ring 110 (FIG. 1).

The lower body portion 86 is illustrated as comprising a bobbin portion which, in turn, is comprised of axially spaced annular flanges 112 and 114 along with an arm-like projection 116. An additional projection 118 is situated as against both upper and mid-body portions 82 and 84. Projection 118 is shown as being formed with a recess or cavity 120 and externally situated detent latching portions 122 and 124. The portions 122 and 124 are effective for operatively latching cooperating portions on an electrical connector, comprising conductor means 56 and 58 (FIG. 1), for effecting electrical connection with terminals 60 and 62.

As should now be apparent, the inner housing or body 74 may be, and preferably is, molded and in the process of molding the pair of electrically conductive terminal members 60 and 62 are molded into body 74 as to have their respective upper portions extending into cavity 120 while their respective lower portions 126 and 128 are contained by projection 116. The lower portions 126 and 128 are respectively provided with open-ended slots 132 and 130 into which are tightly received ends 136 and 134 of the wire comprising the electrical coil 78. Inner housing or body 74, although preferably comprised of plastic material, may be comprised of a high resistivity non-magnetic material such as, for example, AISI grade 302 or 303 stainless steel which have a resistivity of approximately 70 microhms/$cm^3$. If the housing or body 74 were to be formed of plastic, such could be, for example, "Ryton". "Ryton" is a trademark of the Phillips Petroleum Co. of Bartlesville, Okla. (U.S.A.)

for polyphenylene sulfide plastic employed for, among other things, molded parts.

Figure 3:
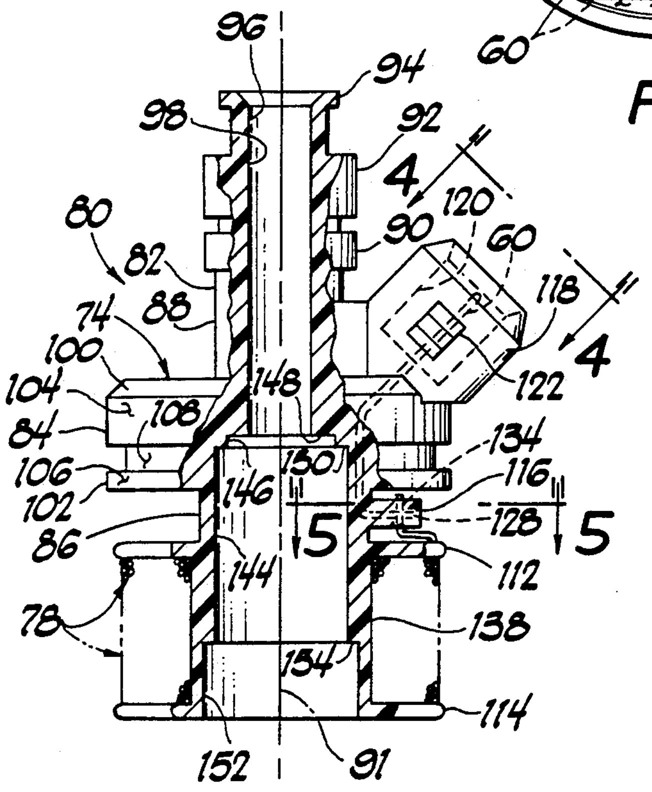
FIG. 3 is a view taken generally on the plane of line 3—3 of FIG. 2 and looking in the direction of the arrows, with portions shown in axial cross-section.
Figure 5:
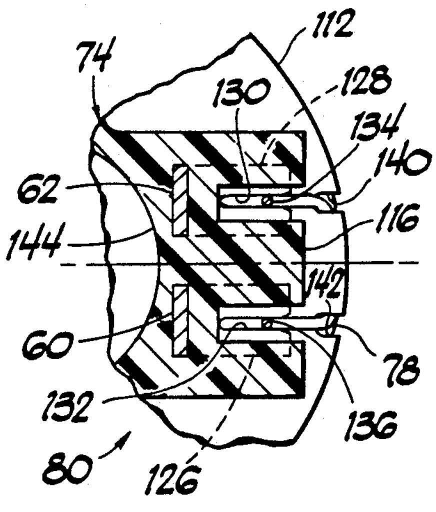
FIG. 5 is a relatively enlarged cross-sectional view of a fragmentary portion of the structure of FIG. 3 taken generally on the plane of line 5—5 of FIG. 3 and looking in the direction of the arrows.
Figure 7:
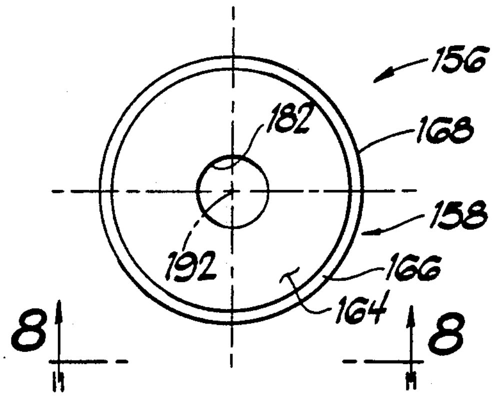
FIG. 7 is a top plan view, in relatively enlarged scale, of one of the elements shown in FIG. 1.
Figure 11:
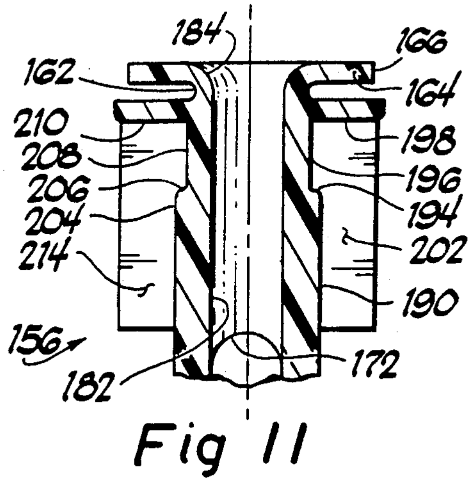
FIG. 11 is a fragmentary cross-sectional view taken generally on the plane of line 11—11 of FIG. 10 and looking in the direction of the arrows.

As generally depicted in FIG. 3, the field coil 78 is formed by wire wound about an outer cylindrical surface 138 and axially between flanges 112 and 114 and once so wound, the wire ends 134 and 136 are passed through notches, or the like, 140 and 142, formed in flange 112, and thereafter respectively connected to terminal ends 128 and 126.

A second cylindrical passage 144, generally axially aligned with passage means 98, is formed in both mid-body 84 and lower body portion 86. The passage 144 is shown as being of a diameter significantly larger than conduit means 98. An axially aligned counterbore-like portion having an outer cylindrical surface 146 of a diameter less than that of passage 144 but larger than that of conduit means 98 is illustrated as being axially generally between passage 144 and conduit 98 thereby defining axially spaced annular shoulders 148 and 150.

A further passage 152, axially aligned with conduit 98 and passage 144 and of a diameter larger than that of passage 144, is formed into the lower end (as viewed in FIG. 3) as to thereby define an annular shoulder 154.

Figure 8:
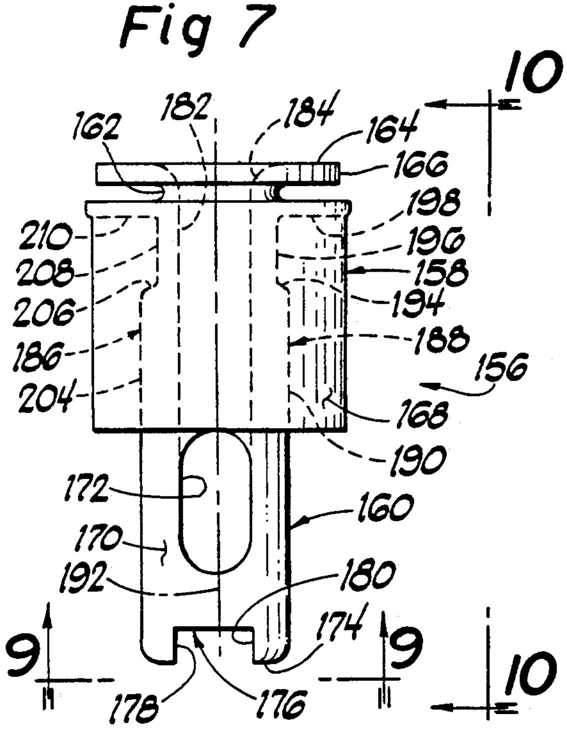
FIG. 8 is a view taken generally on the plane of line 8—8 of FIG. 7 and looking in the direction of the arrows.
Figure 10:
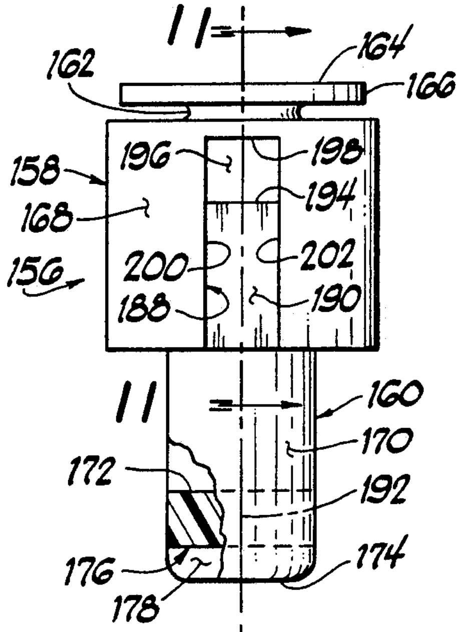
FIG. 10 is a view taken generally on the plane of line 10—10 of FIG. 8 and looking in the direction of the arrows.
Figure 9:
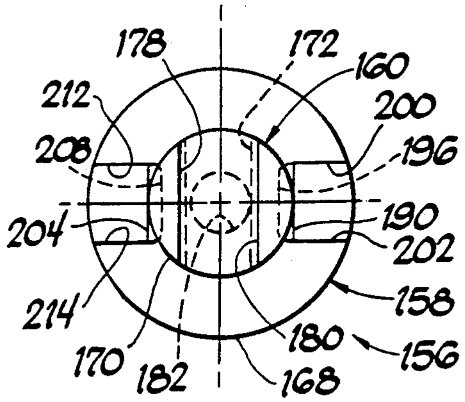
FIG. 9 is a view taken generally on the plane of line 9—9 of FIG. 8 and looking in the direction of the arrows.

Referring in greater detail to FIGS. 7, 8, 9, 10 and 11, an inlet tube and valve holder 156, of non-magnetic material and preferably comprised of plastic material, is illustrated as being at least somewhat cylindrical and formed as to comprise an upper relatively enlarged body portion 158 and an axially aligned relatively reduced body portion 160 (as viewed in FIG. 8). Upwardly of, and axially aligned with body portion 158, is an integrally formed necked-down portion 162 which continues into an axially spaced transverse annular flange 164 the outer diameter 166 of which is preferably less than the diameter of the outer cylindrical surface 168 of upper body portion 158.

The lower body portion 160, integrally formed with upper body portion 158, comprises an outer cylindrical surface 170 and a passage 172 formed transversely therethrough. The lowermost (as viewed in FIG. 8) end 174 of body portion 160 has a slot-like recess 176 formed therein as to, preferably, provide parallel spaced side walls 178 and 180. A centrally formed passage or conduit means 182, having an inlet end 184, extends from the uppermost end of member 156 to cross-passage means 172 as to be in communication therewith.

A pair of diametrically opposite slot-like recesses 186 and 188 are formed in upper body portion 158. More particularly, slot 188 is comprised of a radially inner wall 190 which is tangent to body portion 160 cylindrical surface 170 and parallel to the axis 192 of member 156. As the wall 190 approaches the upper end of member 156, a transitional portion 194 joins it to a further wall 196 which is parallel to wall 190 and situated even further radially inwardly. Wall 196 continues and terminates as in an abutting-like relationship with an end wall 198 which is normal to axis 192. The recess 188 is completed by opposed spaced side walls 200 and 202 which are parallel to each other and to axis 192 and which terminate against end wall 198, inner walls 190, 196 and transitional portion 194.

Similarly, slot 186 is comprised of a radially inner wall 204 which is tangent to body portion 160 cylindrical surface 170 and parallel to both axis 192 and wall 190. As the wall 204 approaches the upper end of member 156, a transitional portion 206 joins it to a further wall 208 which is parallel to wall 204 and situated even further radially inwardly. Wall 208 continues and terminates as in an abutting-like relationship with an end wall 210 which is normal to axis 192 and coplanar with wall 198. The recess 186 is completed by opposed spaced side walls 212 and 214 which terminate against end wall 210, inner walls 204, 208 and transitional portion 206. Walls 212 and 214 are formed as to have wall 212 coplanar with wall 200 and wall 214 coplanar with wall 202.

Referring in greater detail to FIGS. 14, 15, 16, 17 and 18, a valve seat member 216 is depicted as comprising a relatively elongated body preferably formed of wear-resistant non-magnetic material such as, for example, AISI grade 302 or 303 stainless steel which have a resistivity of approximately 70 microhms/$cm^3$. The valve seat member 216 may be considered as having upper and lower body portions 218 and 220 (as viewed in FIG. 14).

Figure 15:
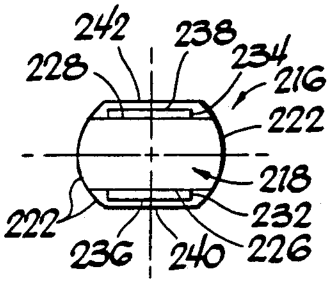
FIG. 15 is a view taken generally on the plane of line 15—15 of FIG. 14 and looking in the direction of the arrows.
Figure 16:
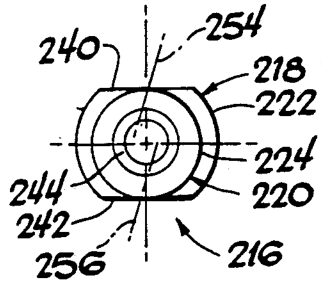
FIG. 16 is a view taken generally on the plane of line 16—16 of FIG. 14 and looking in the direction of the arrows.

As best seen in FIGS. 15 and 16, both body portions 218 and 220 are cylindrical and axially aligned with each other with body portion 218 having an outer cylindrical surface 222 and body portion 220 having an outer cylindrical surface 224 of a diameter less than that of cylindrical surface 222.

Figure 14:
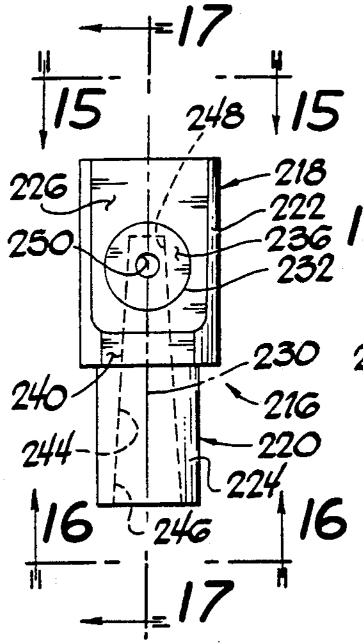
FIG. 14 is an elevational view, in relatively enlarged scale, of another element shown in FIG. 1.

Body portion 218 has oppositely situated flat surfaces 226 and 228 which are parallel to each other and to central axis 230. Formed integrally with body portion 218 are oppositely directed valve seat portions 232 and 234 respectively provided with valve seats or valve seating surfaces 236 and 238 which, when viewed as in FIG. 14, are circular in configuration. The valve seat portions 232 and 234 are formed generally within the boundary defined, respectively, by flat surfaces 226 and 228 and have their valve seats 236 and 238, which are preferably flat, parallel to and spaced from adjoining flat surfaces 226 and 228.

As best seen in FIGS. 14, 15 and 16, body portion 218, at its end adjoining body portion 220, is formed with a second set of flat surfaces 240 and 242 respectively parallel to valve seats 236 and 238 but spaced at a distance radially further from axis 230 than valve seats 236 and 238. As shown in FIG. 16, such flat surfaces 240 and 242 are both, preferably, tangent to cylindrical surface 224 of body portion 220.

A discharge passage or conduit means 244 is formed in body portions 218 and 220 as to have a lower (as viewed in FIGS. 14 and 17) open end 246 and an upper closed end 248. The axially extending conduit means 244 is aligned with axis 230 and is preferably formed as to be tapered whereby the upper end 248 is of a diameter smaller than the diameter of lower open end 246.

Figure 17:
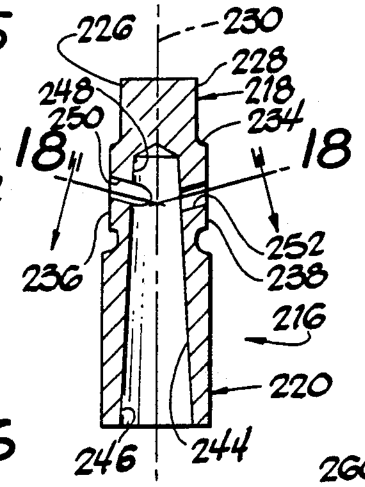
FIG. 17 is an axial cross-sectional view taken generally on the plane of line 17—17 of FIG. 14 and looking in the direction of the arrows.

Fuel metering passages or conduits 250 and 252 are formed through body portion 218 and respectively through valve seat portions 232 and 234 as to be in communication with passage 244. As typically depicted by passage 250 in FIG. 14, each of the passages 250 and 252 have open inlet ends formed centrally of the associated valve seat and, further, as depicted in FIG. 17, passages 250 and 252 are both inclined with respect to axis 230 as to have their respective discharge ends more nearly aimed or directed toward the open end 246 of passage 244.

Figure 18:
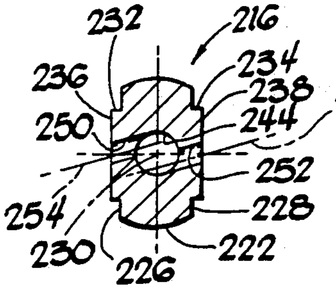
FIG. 18 is a transverse cross-sectional view taken generally on the plane of line 18—18 of FIG. 17 and looking in the direction of the arrows.

As best seen in FIG. 18, the passages 250 and 252 are also preferably formed as to have their respective axes 254 and 256 skew with respect to axis 230. This is done in a manner whereby, preferably, each of the passages or conduits 250 and 252 have one diametral side tangent to the surface of central conduit 244 at the areas where such passages 250 and 252 open into conduit 244. As a consequence, such fuel as flows through passages 250 and 252 and is discharged into conduit means 244 experiences a swirling action within conduit means 244 thereby enhancing fuel atomization. Passages 250 and 252 are, preferably, calibrated as to their effective flow areas; such could also be achieved, if desired, by employing calibrated restriction or metering inserts set into relatively larger diameter passages 250 and 252.

Figure 19:
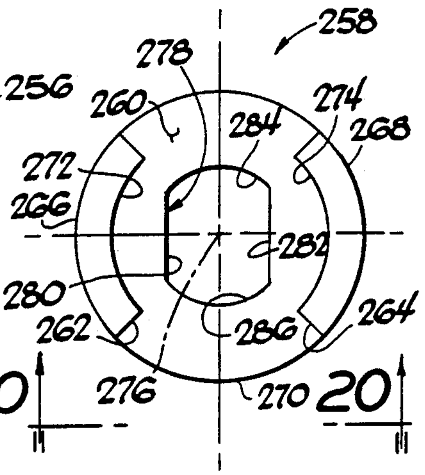
FIG. 19 is a top plan view, in relatively enlarged scale, of still another element shown in FIG. 1.
Figure 20:
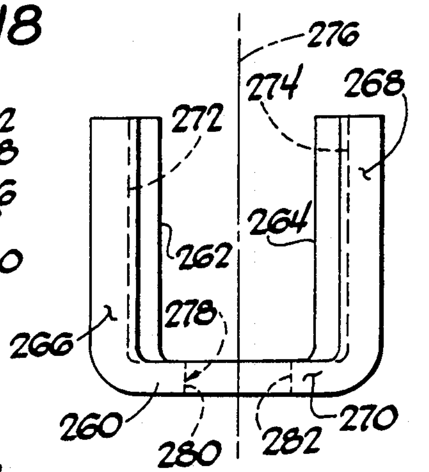
FIG. 20 is a view taken generally on the plane of line 20—20 of FIG. 19 and looking in the direction of the arrows.

FIGS. 19 and 20 illustrate the pole piece 258, comprised of magnetic material, as having a lower (as shown in FIG. 20) base portion 260 which, as viewed in FIG. 19, is of a circular or disc-like configuration and has integrally formed upwardly directed arcuate walls 262 and 264, diametrically opposed to each other. In the preferred embodiment, the outer cylindrical surfaces 266 and 268 of walls 262 and 264 are coincident with and, effectively, extensions of the outer cylindrical surface 270 of base portion 260. The inner cylindrical surfaces 272 and 274, of walls 262 and 264, have the same radius from pole piece axis 276 and are concentric with outer cylindrical surfaces 266, 268 and 270. A centrally disposed aperture 278 is formed through base portion 260 and is depicted as preferably comprised of a pair of spaced parallel flat walls 280 and 282 joined at opposite ends by arcuate (preferably portions of a circle) walls 284 and 286. In the embodiment shown aperture walls 280 and 282 are respectively symmetrically situated with respect to upstanding walls 262 and 264. The pole piece means 258 is preferably formed of a high resistivity magnetic material such as a nickel-iron or a 400 series stainless steel. For example, such could be a Carpenter High Permeability "49" nickel-iron with such obtainable from Carpenter Technology, Inc. while the stainless steel could be a Carpenter 430F solenoid quality stainless steel also obtainable from Carpenter Technology, Inc. with the resistivity of such being in the range of 40 to 100 microhms/cm$^3$.

Figure 24:
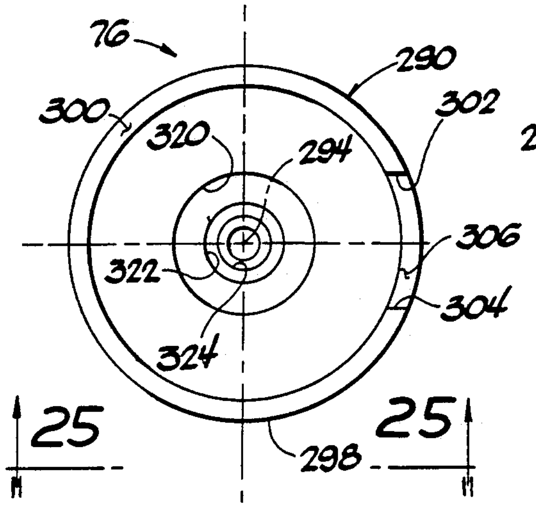
FIG. 24 is a top plan view, in relatively reduced scale, of yet another element shown in FIG. 1.
Figure 25:
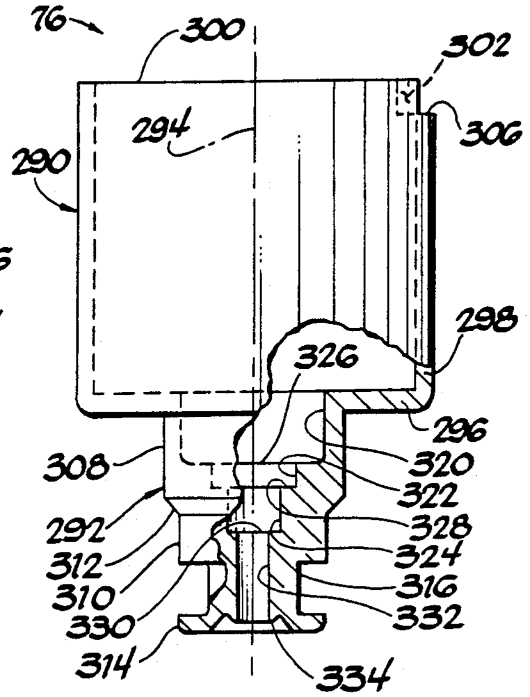
FIG. 25 is a view taken generally on the plane of line 25—25 of FIG. 24 with a portion thereof being shown in axial cross-section.

FIGS. 24 and 25 illustrate the outer housing or case 76, preferably formed of steel, as being generally tubular and having an upper (as viewed in FIG. 25) body portion 290 and an integrally formed lower body portion 292 both concentric to an axis 294. The upper body portion 290 is of a cup-like configuration having a bottom or lower end wall 296 and an integrally formed upstanding cylindrical side wall 298. The upper end 300 of wall 298 is provided with a cut-out or relieved portion defined as by side surfaces 302 and 304 and lateral joining surface 306.

The lower body portion 292 is depicted as a generally tubular extension depending from end wall 296 and having outer cylindrical surfaces 308 and 310, joined as by a transitional annular surface 312, along with an axially spaced radiating annular flange 314. An annular recess 316, generally axially between flange 314 and cylindrical portion 310, is effective for receiving therein suitable sealing means such as, for example, O-ring 318 (FIG. 1). A series of coaxial counterbores 320, 322 and 324 are formed in lower body portion 292 as to define respective annular shoulder surfaces or abutments 326, 328 and 330 and as to complete communication as from the interior of upper housing portion 290 to an axially aligned conduit or passage means 332. Preferably, the material generally surrounding and effectively defining the exit or discharge end 334 of conduit 332 is formed as to at least approach a knife-edge cross-sectional configuration to thereby reduce any tendency for the fuel flowing therefrom to accumulate, on such surface, into droplet form.

Figure 26:
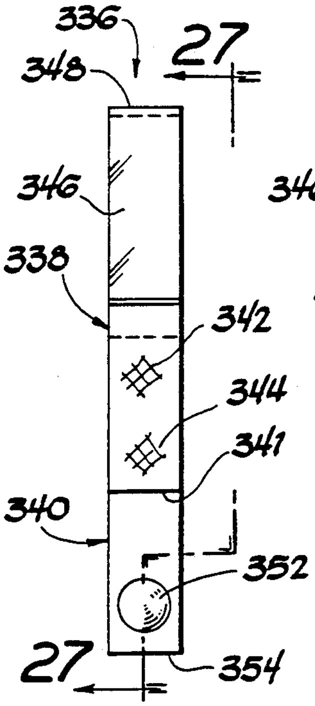
FIG. 26 is an elevational view, in relatively enlarged scale, of a further element shown in FIG. 1.
Figure 27:
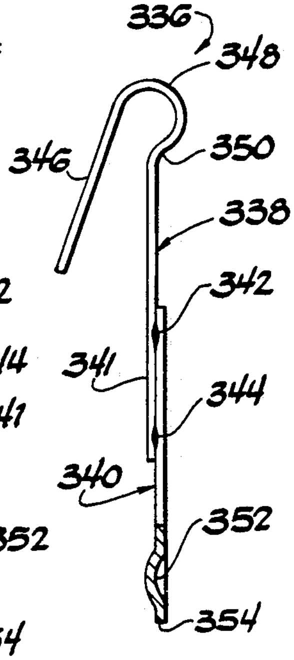
FIG. 27 is a view taken generally on the plane of line 27—27 of FIG. 26 and looking in the direction of the arrows.

FIGS. 26 and 27 depict what may be considered as a spring and armature assembly 336 which is shown as comprising a spring member 338 suitably secured to an armature member 340 of magnetic material, preferably by welding one relatively long arm 341 of spring 338 to the armature member 340, as generally indicated or depicted at 342 and 344. In the preferred embodiment, spring 338 is of flat stock and has a second relatively shorter arm 346 which is joined to arm 341 by a bight portion 348. As best seen in FIG. 27, the bight portion 348 is preferably bent, as at 350, to thereby bring it, in a generally reverse direction, out of the plane of arm 341. A spherical-like portion 352 is formed near the lower (as viewed in FIGS. 26 and 27) end 354 of armature member 340.

Figure 29:
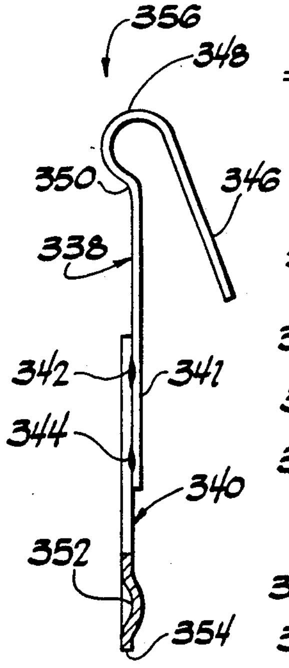
FIG. 29 is a view taken generally on the plane of line 29—29 of FIG. 28 and looking in the direction of the arrows.
Figure 28:
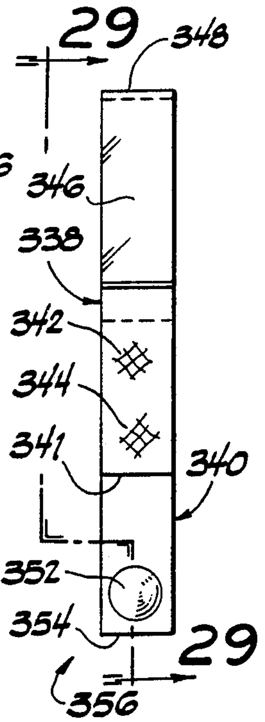
FIG. 28 is an elevational view, in relatively enlarged scale, of still another element shown in FIG. 1.

FIGS. 28 and 29 depict a second spring and armature assembly 356 which may be considered as identical to the assembly 336 of FIGS. 26 and 27. All elements in the assembly 356 which are like or similar to those of assembly 336 are identified with like reference numbers. The armatures 340—340 of FIGS. 26–29 are also preferably formed of a high resistivity material such as the Carpenter High Permeability "49" or Carpenter 430F material previously referred to herein.

Figure 12:
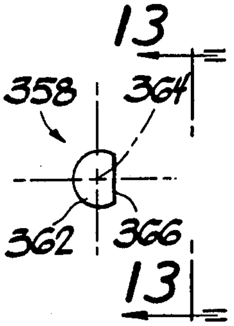
FIG. 12 is a relatively enlarged, generally side elevational view of another of the elements shown in FIG. 1.
Figure 13:
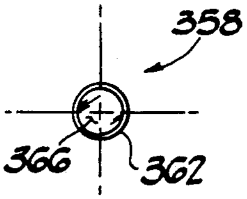
FIG. 13 is a view taken generally on the plane of line 13—13 of FIG. 12 and looking in the direction of the arrows.

Two valving members 358 and 360 are shown in FIG. 1. Both members 358 and 360 are, effectively, identical to each other and valve member 358 is illustrated in FIGS. 12 and 13 to show, typically, the preferred construction of valve members 358 and 360. FIGS. 12 and 13 illustrate that for the most part valve member 358 has an outer spherical surface 362 and that at a distance spaced from the center 364 of the spherical surface 362, and opposite to the remaining portion of the spherical surface, the body of valve member 358 is formed with a flat surface 366 which comprises the valving surface means thereof. Although the invention is not so limited, in the preferred embodiment each of valve members 358 and 360 would be formed of magnetic material such as steel.

Figure 21:
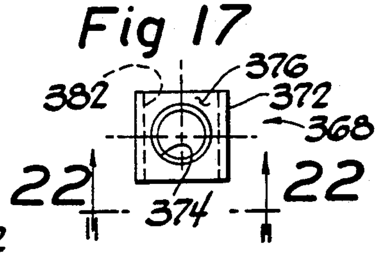
FIG. 21 may be considered a top plan view, in relatively enlarged scale, of another element shown in FIG. 1.
Figure 22:
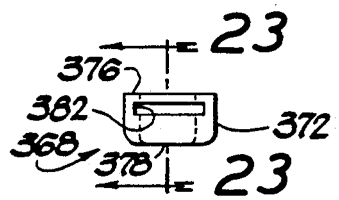
FIG. 22 is a view taken generally on the plane of line 22—22 of FIG. 21 and looking in the direction of the arrows.
Figure 23:
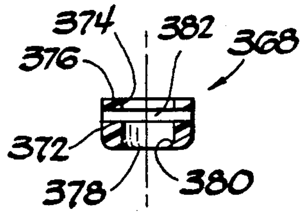
FIG. 23 is a cross-sectional view taken generally on the plane of line 23—23 of FIG. 22 and looking in the direction of the arrows.

FIG. 1 also illustrates two valve member retainers 368 and 370 which are, effectively, identical to each other. Retainer member or means 368 is illustrated in FIGS. 21, 22 and 23 to show, typically, the preferred construction of retainer means 368 and 370. In the preferred embodiment, both retainers 368 and 370 are made of plastic material having limited elastomeric properties when subjected to an applied load. Referring in greater detail to FIGS. 21, 22 and 23, the retainer 368 is illustrated as comprising a body 372, which as viewed in FIG. 21 may be of square configuration, having a generally cylindrical passage 374 formed therethrough extending from and through the upper (as viewed in FIGS. 22 and 23) end or surface 376 and through the lower end or surface 378 of body 372. For the most part, passage 374 is of a diameter closely approaching the spherical diameter of valve member 358 with the exception that as the passage 374 approaches the lower end 378, the passage is reduced in diameter as by an annular lip or abutment portion 380 which, preferably, has an inner contour equal to the spherical surface 362 of valve member 358. Further, a slot 382 is formed through body 372 with such slot 382 having a height (as viewed in FIGS. 22 and 23) and width (as viewed in FIGS. 21 and 22) equal to or slightly less than the thickness and width of the flat plate armature member 340 of FIGS. 26 and 27.

The various elements and or details as disclosed in FIGS. 2–29 may be assembled into the assembly 10 of FIG. 1, generally as follows wherein, it is assumed that the body and coil assembly 80, of FIGS. 2-6 has already been formed as previously described with regard thereto.

FIG. 1 illustrates reed type or cantilever type valving assemblies 384 and 386. Valving assembly 384 is shown as being comprised of the spring and armature assembly 336 (FIGS. 26 and 27), valving member 358 (FIGS. 12 and 13) and retainer means 368 (FIGS. 21, 22 and 23). Similarly, valving assembly 386 is shown as being comprised of the spring and armature assembly 356 (FIGS. 28 and 29), valving member 360 which is effectively identical to valving member 358 and retainer means 370 which is effectively identical to retainer means 368.

The following method may be employed in forming the valving assemblies 384 and 386 and, for purposes of discussion, the assembling of valving assembly 384 will be considered, such, of course, being applicable to the assembling of valving assembly 386. All that needs to be done is to insert end 354 of the armature member 340 (FIGS. 26, 27) into the slot 382 of retainer 368 (FIGS. 21, 22 and 23) in a manner whereby the end 376 of retainer 368 is disposed generally to the left of armature member 340 (as viewed in FIG. 27) and the end 378 of retainer 368 is disposed generally to the right of armature member 340. Thereafter, the retainer 368 is pushed onto the armature member 340 (remembering that the retainer means 368 and 370 are relatively resiliently deflectable) until the spherical like portion 352 of the armature member 340 becomes situated within the passage 374 of retainer means 368 as depicted in FIG. 1. Thereafter, the valve member 358 (FIGS. 12 and 13) is pressed into passage 374, from end 378 of retainer 368, by resiliently expanding the annular portion 380 of passage 374. The valve member 358 then becomes retained within retainer 368, as generally depicted in FIG. 1, and held against the spherical portion 352 of armature member 340. Although not shown, it is contemplated that in the preferred embodiment a spring like washer or spacer would be provided as between the valve members 358 and 360 and the respective spherical surfaces 352 of the armature members 340.

As can be seen in FIG. 1, the inlet tube and valve holder 156 (FIGS. 7-11), the valve seat member and swirl chamber 216 (FIGS. 14-18) and pole piece 258 (FIGS. 19 and 20) are operatively connected to each other and arranged in a particular relationship to each other. That is, pole piece 258 will receive, in an assembled fashion, the valve seat member 216 within aperture 278 only when flat surfaces 240 and 242 of valve seat member 216 are respectively against flat surfaces 280 and 282 of pole piece aperture 278, or reversed so that surfaces 240 and 242 of valve seat member 216 are respectively against flat surfaces 282 and 280. In either case, the valve seat surfaces 236 and 238 (of seat member 216) become positioned as to be symmetrically situated with respect to pole piece arms 262 and 264 and facing toward such pole piece arms.

Further, the upper end (as viewed in any of FIGS. 1, 14 or 17) of valve seat member 216 is received, in an assembled fashion, by the lower end (as viewed in any of FIGS. 1, 8 or 10) 174 of the inlet tube and valve holder 156 only when flat surfaces 226 and 228 of valve seat member 216 are received within recess 176 as to be respectively against surfaces 178 and 180 of recess 176, or, reversed as to be respectively against surfaces 180 and 178. In either case, the slots or recesses 186 and 188 of inlet tube and valve holder 156 become, what may be termed, functionally aligned with the valve seat surfaces 236, 238 of the valve seat member 216. Consequently, when the valving assemblies 384 and 386 within the cooperating receiving recesses or slots (186 or 188) the valve members 358 and 360 are automatically in position as to sealingly seat against valve seat surfaces 236 and 238 of valve seat member 216 to thereby terminate flow through metering passages 250, 252.

In view of the foregoing, it can be seen that when the inlet tube and valve holder 156, valving assemblies 384, 386, valve seat member 216 and pole piece 258 are thusly assembled, they are assembled in precise angular relationships to each other and that such angular relationships are maintained.

However, a review of inner body 74, as best seen in FIG. 3, will show that passages or bores 146, 144 and 152 are all cylindrical. Similarly, a review of outer housing or body 76, as best seen in FIGS. 24 and 25, will show that passages or bores 320 322 and 324 are also cylindrical, with bore or passage 320 being, in effect, a continuation of passage 152 of inner body 74 (FIGS. 1 and 3). Consequently, even though members 156, 216 and 258 are effectively collectively locked in their angular relationship and position to each other, such, as a sub-assembly, may, nevertheless, be situated in any angular relationship about the axis of bores or passages 146, 144, 152, 320, 322 and 324.

In assembling the overall metering valving assembly 10, valve assemblies 384 and 386 may be placed against or connected to the inlet tube and valve holder 156 by inserting the spring portions 338—338 thereof as into slots or recesses 186 and 188 of member 156 in a manner whereby the somewhat eccentric or bulging portions of the spring bights are seated as against the flat surfaces 196 and 208 within recesses 188 and 186 with the uppermost position being, of course, determined by upper (as viewed in FIGS. 8, 10 and 11) surfaces 198 and 210 and spring bight portions 348—348. With the shorter arms 346—346 of spring portions 338—338 being pushed radially inwardly, the spring holder 156 and valving assemblies 384 and 386 are then axially inserted into cylindrical bore or passage 144 in inner body or housing 74 (FIGS. 1 and 3).

Thereafter, the valve seat member 216 may be inserted generally between the opposite valve members 358 and 360 and axially urged into the end recess, slot or keying means 176 (FIGS. 8 and 10) to assume a position as that generally depicted in FIG. 1. Next, the pole piece means 258 may be placed generally about and axially moved relative to valve seat member 216 causing the opposed flat surfaces 280 and 282 of pole piece 258 to engage the flat surfaces 240 and 242 of the valve seat member 216 and to have the upper portions of pole piece arms 262, 264 received in passage or bore 152 of inner body or housing 74.

With the foregoing accomplished, the inner housing and coil assembly 80 (along with 156, 384, 386, 216 and 258 effectively carried thereby) can be assembled to the outer housing 76 by placing a tubular cylindrical sleeve-like member 390, preferably of magnetic steel, within the outer housing 76, as against the inner surface of cylindrical wall 298 (FIGS. 24 and 25) and, preferably, as to axially abut against the inner surface of transverse wall portion 296 (FIGS. 1 and 25).

A suitable O-ring seal 388 may then be placed either within bore 322 of outer housing 76 or about body portion 220 of valve seat member 216 and the entire inner body or housing and coil assembly 80 (along with 156, 384, 386, 216 and 258) moved axially inwardly of outer housing 76 and shell-like member 390 as to thereby cause: (a) the lower (as viewed in FIG. 14) body portion 220 of valve seat member 216 to be received in passage or bore 324 of outer housing 76; (b) the lower portions of pole piece arms 262, 264 to be received in passage or bore 324 of outer housing 76; and (c) the base portion 260 of pole piece means 258 to be received in passage or bore 324 and, preferably, seated as against the annular flange or shoulder 326. When this is completed, the lower surface of body portion 102, of inner body or housing 74 (FIG. 3) is preferably in abutting engagement with the top of inner shell 390 and, of course, the angular integrally formed portion 118 (FIGS. 2, 3 and 4) extends through the space provided in outer housing 76 by the cut-out portion defined by walls 302, 304 and 306 (FIGS. 24 and 25). Thereafter, the upper portion of outer housing wall 298 may be suitably formed-over inner housing or body 74, as generally depicted at 392 thereby maintaining the elements described in an assembled condition illustrated in FIG. 1. The shell or tubular casing 390 is preferably of very thin magnetic material of high resistivity such as, for example, a 400 series stainless steel one example of which has hereinbefore been given, that being, a Carpenter 430F solenoid quality stainless steel. Further, in the preferred embodiment the wall thickness of the shell 390 could be in the range of 0.2 mm. to 1.5 mm.

As discussed with reference to FIGS. 7, 8, 10 and 11, the inlet tube and valve carrier 156 is provided with an upper annular flange 164 which is capable of undergoing resilient deflection. When the carrier 156 is inserted into passage or bore 144, as previously described, the flange 164 abuts against the annular abutment surface 150 (FIG. 3) and when all of the elements and inner and outer housings or bodies are axially compressed into assembled condition, as by the forming over of the upper portion 392 of outer housing 76, the carrier 156 is, to some degree, further axially urged toward such annular shoulder 150 and consequently the annular flange 164 is resiliently deflected by the shoulder 150 into a condition as generally depicted in FIG. 1 thereby accomplishing the function of compensating for slight axially extending dimensional differences arising out of a "stack-up" of manufacturing tolerances and, at the same time, providing a resilient force for maintaining the carrier 156 in a set position upon completion of assembly.

Referring in particular to FIG. 1, the metering valve assembly 10 may be suitably received within a passage 392 of related structure 394, which may comprise a portion of the overall induction means 20.

Fuel, from reservoir 14, is supplied by pump means 66 via conduit means 68 to inlet 96 of conduit means 98 which preferably contains a conical-like filter 396. The fuel, the superatmospheric pressure of which may be regulated as by pressure regulating means 72, flows through conduit 98 and into and through conduit means 182 which directs such fuel to the cross-passage 172. The cross-passage 172, in turn, discharges the fuel into and effectively filling the available space or cavity 398 within the assembly 10 with, of course, valve members 358 and 360, because of being seated, preventing out flow of such fuel.

The valving assembly 10 is primarily intended for duty-cycle type operation. When coil means 78 is in its de-energized state, springs 338—338 hold the armatures 340—340 and valves 358 and 360 in their closed positions whereat the sealing surface 366 of valve member 358 is in sealing engagement as with valve seating surface 236 and whereat the sealing surface 366 of valve member 360 is in sealing engagement as with valve seating surface 238. At this time all flow of fuel through metering passages 250 and 252 to the swirl chamber passage 244, from the interior or space 398, is terminated.

When coil means 78, preferably comprised of copper alloy wire having a resistance greater than 16 ohms, becomes energized a magnetic flux is generated and such flux path comprises the magnetic body or housing means 76, the shell or cylinder 390, pole piece means 258 and armatures 340—340 of the spring armature assemblies 336 and 356. In this regard, it should be mentioned that in the preferred embodiment valve members 358 and 360 wold also act as armatures and that, therefore, the valve member 358 with its cooperating armature member 340 could, collectively, be considered armature means and, similarly, valve member 360 with its cooperating armature member 340 could, collectively be considered armature means. As a consequence of such flux field the valve members 358 and 360 are simultaneously drawn away from their cooperating valve seating surfaces 236 and 238 against the resilient resistance of respective spring means 338—338. Such movement of the valves 358 and 360, and armature members 340—340 will be determined by the spring rate of respective springs 338—338 and may, in fact, continue until the free ends of the valving assemblies 384 and 386 abut against the juxtaposed arms of pole piece means 258. At this time, of course, fuel is permitted to flow through metering passages 250, 252 (which are preferably skew to passage 244) and into the swirl passage or conduit 244 from where it flows through conduit 332 to be discharged into the induction passage 22.

OPERATION OF THE INVENTION

The rate of metered fuel flow, in the embodiment disclosed, will be principally dependent upon the relative percentage of time, during an arbitrary cycle time or elapsed time, that the valve members 358 and 360 are relatively close to or seated against respective seating surface means 236 and 238 of the valve seat member 216 as compared to the percentage of time that the valve members 358 and 360 are opened or away from the cooperating seating surface means 236 and 238.

This is dependent upon the output to coil means 78 from the control means 16 which, in turn, is dependent upon the various parameter signals received by the control means 16. For example, if the oxygen sensor and transducer means 34 senses the nee of a further fuel enrichment in the motive fluid being supplied to the engine and transmits a signal reflective thereof to the control means 16, the control means 16, in turn, will require that the metering valves 358 and 360 be opened a greater percentage of time as to provide the necessary increased rate of metered fuel flow. Accordingly, it will be understood that given any selected parameters and/or indicia of engine operation and/or ambient conditions, the control means 16 will respond to the signals generated thereby and respond as by providing appropriate energization and de-energization of coil means 78 (causing corresponding movement of valve members 358 and 360) thereby achieving the then required metered rate of fuel flow to the engine 12.

As best seen in FIGS. 1, 17 and 18, in the preferred embodiment the fuel metered through passages 250 and 252 undergoes a swirling action as it flows into and through the passage or swirl chamber 244. This is achieved by positioning the metering passages 250 and 252 as to be skew to the axis 230 (FIGS. 14, 17 and 18) of chamber 244 which, preferably also enlarges in cross-sectional flow area in the downstream direction. Consequently, the metered fuel experiences enhanced atomization which, of course, improves subsequent combustion in the engine. Also, in the preferred embodiment, passages 250 and 252 are formed as to be directed somewhat downstream. That is, as fuel is dicharged from metering passages 250 and 252 it is flowing in a direction which is at least somewhat directed toward the discharge end of the swirl conduit or chamber 244. This, in turn, results in greater uniformity of flow through chamber means 244.

As should now be apparent, the invention provides for a metering valving member (as 358 and/or 360) which is movable to and from opened and closed positions without having to undergo a sliding movement within an associated guide and without the concern for concentricities of cooperating elements as in prior art valving assemblies. For example, valve member 358 is carried as at an end of a generally cantilever-like arm comprised of spring arm 341 and armature member 340 (FIGS. 1, 26 and 27) and as such requires no guiding means in its movement to and from valve seating surface 236 because its travel is determined by the swinging end of the spring arm 341 and armature member 340. Further, the valving surface 366 of valve member 358 is considerably greater in area than is the cross-sectional flow area of the metering passage 250 and therefore there is no critical alignment requirement as between the valve member 358 and metering passage 250. Also, even though the valve member 358 is carried by retainer 368, the position of the valve member 358 relative to retainer 368 is not rigidly fixed. That is, because of the resilience of retainer 368, valve member 358 can experience some degree of relative angular movement with respect thereto. Consequently, valve member 358 will automatically adjust until its valving surface 366 properly and totally seats against cooperating valve seating surface means 236. Again, it can be seen that another prior art critical dimensional relationship is eliminated by the invention.

As best shown in FIG. 1, it can be seen that in the preferred embodiment the field or flux generating means is in the form of a ring-like or annular coil 78 having its central axis generally coincident with the major central axis 400 of the valving assembly 10. (The axis 400 of FIG. 1 may be considered as containing or comprising the several axes: 91 of FIGS. 2 and 3; 192 of FIGS. 7, 8 and 10; 230 of FIGS. 14, 17 and 18; 276 of FIGS. 19 and 20; and 294 of FIGS. 24 and 25.) It will be further noted that when coil means 78 is energized and valve member 358 moves in its opening direction, the direction of such movement is substantially transverse to the direction of the central axis of the coil means 78. The same, of course, occurs when the valve member 358 is being returned to its closed position against valve seating surface means 236.

Also, as shown in FIG. 1, the pole piece means 258, as by portion 262 thereof, is situated generally between the field coil means 78 and the armature member 340 of assembly 384. Consequently, as the valve member 358 (while in its opening movement) moves transversely of the central axis of coil means 78 it simultaneously moves toward the pole piece means 258, 262.

In view of the foregoing, it should also be apparent that in the preferred embodiment of the invention the undesirable effects of eddy currents, upon response time and decay time, are greatly reduced if not effectively totally eliminated. That is, large non-magnetic gaps as well as the use of high resistivity material which is thin in cross-section effectively eliminate eddy currents within the electromagnetic system. Examples of such materials, and related specifications, have herein been described. As should be apparent from FIG. 1, the air gap (non-magnetic gap) as between the cylindrical casing 390 and the pole piece portion 262 is quite large especially when compared to the air gap distance between the pole piece portion 262 and armature member 340. Even though the air gaps or non-magnetic gaps would be dependent upon or be related to the size of coil means 78, by way of example, such a gap as between the radially inner surface of cylindrical casing 390 and pole piece 262 would be in the range of 1.0 mm. to 15.0 mm. while the gap between the pole piece 262 and armature member 340 (of assembly 384) could be in the range of 0.03 mm. to 1.0 mm.

In the foregoing description of the action and relationships of valving member 358, it is to be understood that such is to be considered as typical in that it applies equally well to valving member 360 and its action and relationships.

The invention has been disclosed as being employed as a throttle body type of fuel injector. The invention is not so limited and, as should be apparent, may be employed as fuel metering injectors for multi-point or port type injection systems as well as for other fluid metering functions.

Although only a preferred embodiment of the invention has been disclosed and described, it is apparent that other embodiments and modifications of the invention are possible within the scope of the appended claims.

What is claimed is:

1. A valving assembly for variably restricting fluid flow, comprising housing means, electrical field coil means for creating a magnetic field flux, wherein said field coil means comprises a cross-sectional longitudinal axis, pole piece means, a valve seat, fluid flow passage means formed through said valve seat, a movable valve, armature means, and resilient means normally operatively resiliently urging said valve toward operative seating engagement with said valve seat as to thereby terminate flow of said fluid through said fluid flow passage means, wherein said electrical field coil means upon being energized is effective to create said magnetic field flux and cause said armature means to move said valve in a direction away from said valve seat to thereby permit flow of said fluid through said fluid flow passage means, wherein as said valve moves in said direction away from said valve seat said valve is moving in a direction generally transverse to said cross-sectional longitudinal axis, and wherein said movable valve also serves as an armature member in addition to said armature means.

2. A valving assembly according to claim 1 wherein said field coil means is of a ring-like configuration having a central axis, wherein said central axis comprises said longitudinal axis, wherein said resilient means comprises a cantilever-like spring arm, wherein said armature means is operatively connected to said spring arm as to have a swingable end, and wherein said armature member is operatively connected to said armature means at an area thereof which is at least closely situated to said swingable end of said armature means.

3. A valving assembly for variably restricting fluid flow, comprising housing means, electrical field coil means for creating a magnetic field flux, wherein said field coil means comprises a cross-sectional longitudinal axis, pole piece means, a valve seat, fluid flow passage means formed through said valve seat, a movable valve, armature means, said resilient means normally operatively resiliently urging said valve toward operative seating engagement with said valve seat as to thereby terminate flow of said fluid through said fluid flow passage means, wherein said electrical field coil means upon being energized is effective to create said magnetic field flux and cause said armature means to move said valve in a direction away from said valve seat to thereby permit flow of said fluid through said fluid flow passage means, and wherein as said valve moves in said direction away from said valve seat said valve is moving in a direction generally transverse to said cross-sectional longitudinal axis, and further comprising fluid swirl chamber means communicating with said fluid flow passage means downstream thereof, wherein said swirl chamber means comprises an axis extending generally in the direction of flow of said fluid through said swirl chamber means, and wherein said fluid flow passage means is formed as to have an axis of flow therethrough skew to said axis of said swirl chamber.

4. A valving assembly according to claim 1 wherein said pole piece means is situated generally between said field coil means and said armature means, and wherein said pole piece means is also situated between said field coil means and said armature member.

5. A valving assembly for variably restricting fluid flow, comprising housing means, electrical field coil means for creating a magnetic field flux, wherein said field coil means comprises a cross-sectional longitudinal axis, pole piece means, a valve seat, fluid flow passage means formed through said valve seat, a movable valve, armature means, and resilient means normally operatively resiliently urging said valve toward operative seating engagement with said valve seat as to thereby terminate flow of said fluid through said fluid flow passage means, wherein said electrical field coil means upon being energized is effective to create said magnetic field flux and cause said armature means to move said valve in a direction away from said valve seat to thereby permit flow of said fluid through said fluid flow passage means, and wherein as said valve moves in said direction away from said valve seat said valve is moving in a direction generally transverse to said cross-sectional longitudinal axis, wherein said field coil means is of a ring-like configuration having a central axis, wherein said central axis comprises said longitudinal axis, and further comprising a second valve seat, wherein said fluid flow passage means comprises first and second fluid flow passages, wherein said first fluid flow passage is formed through the first mentioned valve seat, wherein said second fluid flow passage is formed through said second valve seat, a second movable valve, wherein said armature means comprises first and second armatures, wherein said first armature is effective to move the first mentioned valve in said direction away from said first mentioned valve seat, wherein said resilient means comprises first and second resilient members, wherein said first resilient member is effective for normally operatively resiliently urging said first mentioned valve toward seating engagement with said first mentioned valve seat, wherein said second resilient member is effective for normally urging said second valve toward operative seating engagement with said second valve seat as to thereby terminate flow of said fluid through said second fluid flow passage, wherein said electrical field coil means upon being energized is effective to create said magnetic field flux and cause said second armature to move said second valve in a direction away from said second valve seat to thereby permit flow of said fluid through said second fluid flow passage, and wherein as said second valve moves in said direction away from said second valve seat said second valve is moving in a direction generally transverse to said cross-sectional longitudinal axis.

6. A valving assembly according to claim 5 wherein when said first mentioned valve is moving in a direction away from said first mentioned valve seat and wherein when said second valve is moving in a direction away from said second valve seat the said first mentioned valve and said second valve are moving in directions opposite to each other.

7. A valving assembly according to claim 5 wherein said first armature is secured to and carried by said first resilient member, and wherein said second armature is secured to and carried by said second resilient member.

8. A valving assembly according to claim 5 and further comprising fluid swirl chamber means communicating with said first and second fluid flow passages downstream thereof, wherein said swirl chamber means comprises an axis extending generally in the direction of flow of said fluid through said swirl chamber means, wherein said first fluid flow passage is formed as to have an axis of flow therethrough skew to said axis of said swirl chamber means, and wherein said second fluid flow passage is formed as to have an axis of flow therethrough skew to said axis of said swirl chamber means.

9. A valving assembly according to claim 5 wherein said pole piece means comprises a first pole piece situated generally between said field coil means and said first armature, and wherein said pole piece means comprises a second pole piece situated generally between said field coil means and said second armature.

10. A valving assembly according to claim 5 wherein said pole piece means comprises a first pole piece situated generally between said field coil means and said first armature, wherein said pole piece means comprises a second pole piece situated generally between said field coil means and said second armature, wherein as said first mentioned valve moves in said transverse direction away from said first mentioned valve seat said first mentioned valve moves toward said first pole piece, and wherein as said second valve moves in said transverse direction away from said second valve seat said second valve moves toward said second pole piece.

11. A valving assembly according to claim 5 wherein when said first mentioned valve is moving in a direction away from said first mentioned valve seat and wherein when said second valve is moving in a direction away from said second valve seat the said first mentioned valve and said second valve are moving in directions opposite to each other, wherein said first armature is secured to and carried by said first resilient member, wherein said second armature is secured to and carried by said second resilient member, wherein said pole piece means comprises a first pole piece situated generally between said field coil means and said first armature, wherein said pole piece means comprises a second pole piece situated generally between said field coil means and said second armature, wherein as said first mentioned valve moves in said transverse direction away from said first mentioned valve seat said first mentioned valve moves toward said first pole piece, wherein as said second valve moves in said transverse direction away from said second valve seat said second valve moves toward said second pole piece, and further comprising fluid swirl chamber means communicating with said first and second fluid flow passage downstream thereof, wherein said swirl chamber means comprises an axis extending generally in the direction of flow of said fluid through said swirl chamber means, wherein said first fluid flow passage is formed as to have an axis of flow therethrough skew to said axis of said swirl chamber means, and wherein said second fluid flow passage is formed as to have an axis of flow therethrough skew to said axis of said swirl chamber means.

12. A valving assembly according to claim 1 wherein said resilient means comprises a spring member formed of flat spring stock and having a swingable deflectable end, wherein said armature means is secured to said spring member as to move in swingable unison with said swingably deflectable end, and wherein said armature member is connected to and carried by said armature means at an area thereof which is at least near an end of said armature means opposite to said swingably deflectable end, and wherein said armature member comprises an outer surface of at least partially spherical configuration whereby said spherical configuration permits rotation and inclination of said armature member with respect to said armature means in order to thereby assure continued alignment as between said armature member as a valve and said valve seat.

13. A valving assembly according to claim 1 wherein said armature means is secured to and carried by said resilient means, wherein said housing means comprises a chamber, wherein said resilient means comprises generally U-shaped spring means having first and second legs with respective first and second spring ends, wherein said armature means is secured to said first leg and carried along said first spring end, and further comprising spring holder means, said spring holder means being formed to locate and position said U-shaped spring means relative thereto, and said spring holder means and said spring means being received within said chamber whereby said U-shaped spring means is retained in operating position by virtue of being contained between a portion of a wall defining said chamber and said spring holder means so that said second leg of said U-shaped spring means exerts a resilient force operatively toward said wall defining said chamber and so that said first leg of said U-shaped spring member exerts a resilient force in a direction opposite to said resilient force exerted by said second leg.

14. A valving assembly according to claim 5 wherein said first resilient member comprises a first spring member formed of flat stock and having a swingably deflectable end, wherein said first armature is secured to said first spring member as to move in swingable unison with said swingably deflectable end, wherein said second resilient member comprises a second spring member formed of flat stock and having a swingably deflectable end, and wherein said second armature is secured to said second spring member as to move in swingable unison with said swingably deflectable end of said second spring member.

15. A valving assembly according to claim 5 wherein said first resilient member comprises a first spring having first and second spring ends, wherein said second resilient member comprises a second spring having first and second spring ends, wherein said first armature is secured to and carried along said first spring end of said first spring, wherein said second armature is secured to and carried along said first spring end of said second spring, wherein said housing means comprises a chamber, and further comprising holder means for holding said first and second springs in a selected position relative to said holder means, said holder means comprising first and second locating portions for respectively engaging said first and second springs, wherein said holder means with said first and second springs being in respective engagement with said first and second locating portions are received in said chamber, and wherein when said holder means and said first and second springs are received in said chamber said first and second springs are retained in respective operating positions by virtue of being contained between said holder mean and respective portions of wall means defining said chamber.

16. A valving assembly according to claim 5 wherein said first mentioned movable valve is operatively connected to said first armature by first retainer means, wherein said first retainer means comprises a first retainer body separate from and carried by said first armature, wherein said first retainer body is formed with a first passage therethrough, wherein said first mentioned movable valve is at least in most part situated in said first passage as to be between said first armature and said first valve seat, wherein said second movable valve is operatively connected to said second armature by second retainer means, wherein said second retainer means comprises a second retainer body separate from and carried by said second armature, wherein said second retainer body is formed with a second passage therethrough and wherein said second movable valve is at least in most part situated in said second passage as to be between said second armature and said second valve seat.

17. A valving assembly according to claim 16 wherein each of said movable valves is formed as to have at least a substantial portion of the outer surface thereof of a spherical configuration, wherein each of said movable valves has a generally flat valving surface formed thereon, wherein each of said flat valving surfaces is intended to sealingly seat against a respective one of said first and second valve seats, wherein each of said movable valves is angularly movable relative to respective ones of said first and second retainer bodies thereby enabling each of said flat valving surfaces to seek its proper orientation for sealingly seating against the respective coacting valve seat.

18. A valving assembly according to claim 16 wherein said first and second retainer bodies are each comprised of relatively resiliently deflectable plastic material, wherein said first retainer body comprises a first slot formed therethrough, wherein said first retainer body is connected to and carried by said first armature by inserting a portion of said first armature into said first slot in a manner whereby said first armature extends transversely through said first passage, and wherein said second retainer body comprises a second slot formed therethrough, wherein said second retainer body is connected to and carried by said second armature by inserting a portion of said second armature into said second slot in a manner whereby said second armature extends transversely through said second passage.

19. A valving assembly according to claim 18 wherein said first armature carries a first portion of spherical surface, wherein as said first armature extends through said first passage said first portion of spherical surface is situated in general alignment with said first passage, wherein said second armature carries a second portion of spherical surface, and wherein as said second armature extends through said second passage said second portion of spherical surface is situated in general alignment with said second passage.

20. A valving assembly according to claim 15 wherein said holder means comprises conduit means for the conveying of said fluid from an associated source of said fluid to the interior of said housing means.

21. A valving assembly for variably restricting fluid flow, comprising housing means, electrical field coil means for creating a magnetic field flux, wherein said field coil means comprises a cross-sectional longitudinal axis, pole piece means, a valve seat, fluid flow passage means formed through said valve seat, a movable valve, armature means, said resilient means normally operatively resiliently urging said valve toward operative seating engagement with said valve seat as to thereby terminate flow of said fluid through said fluid flow passage means, wherein said electrical field coil means upon being energized is effective to create said magnetic field flux and cause said armature means to move said valve in a direction away from said valve seat to thereby permit flow of said fluid through said fluid flow passage means, and wherein as said valve moves in said direction away from said valve seat said valve is moving in a direction generally transverse to said cross-sectional longitudinal axis, wherein said armature means is secured to and carried by said resilient means, wherein said housing means comprises a chamber, wherein said resilient means comprises spring means having first and second spring ends, wherein said armature means is secured to and carried along said first spring end, and further comprising spring holder means, said spring holder means being formed to locate and position said spring means relative thereto, and said spring holder means and said spring means being received within said chamber whereby said spring means is retained in operating position by virtue of being contained between a portion of a wall defining said chamber and said spring holder means, wherein said spring holder means comprises conduit means for receiving said fluid from an associated source of said fluid and directing said fluid to areas within said housing means for subsequent flow through said fluid passage means.

22. A valving assembly for variably restricting fluid flow, comprising housing means, electrical field coil means for creating a magnetic field flux, wherein said field coil means comprises a cross-sectional longitudinal axis, pole piece means, a valve seat, fluid flow passage means formed through said valve seat, a movable valve, armature means, and resilient means normally operatively resiliently urging said valve toward operative seating engagement with said valve seat as to thereby terminate flow of said fluid through said fluid flow passage means, wherein said electrical field coil means upon being energized is effective to create said magnetic field flux and cause said armature means to move said valve in a direction away from said valve seat to thereby permit flow of said fluid through said fluid flow passage means, and wherein as said valve moves in said direction away from said valve seat said valve is moving in a direction generally transverse to said cross-sectional longitudinal axis, wherein said field coil means is of a ring-like configuration having a central axis, wherein said central axis comprises said longitudinal axis, wherein said resilient means comprises a cantilever-like spring arm, wherein said armature means is operatively connected to said spring arm as to have a swingable end, and wherein said movable valve is operatively connected to said armature means at an area thereof which is at least closely situated to said swingable end of said armature means, wherein said movable valve is operatively connected to said armature means by retainer means, wherein said retainer means comprises a retainer body separate from and carried by said armature means, wherein said retainer body is provided with a void-like chamber formed therein, and wherein said movable valve is at least in most part contained in said chamber as to be situated between said armature means and said valve means.

23. A valving assembly according to claim 22 wherein said movable valve is formed as to have at least a substantial portion of the exterior thereof of a spherical configuration, a generally flat valving surface formed on said movable valve, wherein said generally flat valving surface is intended to sealingly seat against said valve seat, wherein said movable valve is angularly movable relative to said retainer body thereby enabling said generally flat valving surface to seek its proper orientation for sealingly seating against said valve seat.

24. A valving assembly according to claim 23 wherein said retainer means is comprised of relatively resiliently deflectable plastic material, wherein said retainer body comprises a passage formed therethrough, and wherein said retainer means is connected to and carried by said armature means by inserting a portion of said armature means into said passage of said retainer body.

25. A valving assembly according to claim 23 wherein said armature means comprises a portion of generally spherical configuration, and wherein said retainer body is effective for urging said movable valve in a direction for operative engagement with said portion of generally spherical configuration.

26. A valving assembly for variably restricting fluid flow, comprising housing means, electrical field coil means for creating a magnetic field flux, a plurality of cantilever valving members, a valve holder for positioning and holding said valving members, and a valve seat member, wherein said housing means comprises inlet conduit means for connection to a source of said fluid, chamber means formed in said housing means and in general communication with said inlet conduit means, wherein said housing means comprises bobbin means, wherein said field coil means is carried by said bobbin means in a manner generally circumscribing said chamber means, first and second pole piece means at least partly situated in said chamber means, wherein said valve holder and said cantilever valving members are received by said chamber means, wherein said valve holder comprises first and second holder ends, second conduit means formed through said valve holder and opening through said first holder end, said first holder end being situated as to place said second conduit means in communication with said inlet conduit means, said valve seat member comprising outlet conduit means formed therein, a plurality of valve seat surfaces, a plurality of fluid metering passages formed through said valve seat surfaces and communicating with said outlet conduit means, wherein said plurality of valving members are effective for opening and closing flow of said fluid through said plurality of fluid metering passages, wherein said valve seat member is operatively connected to said second holder end, wherein said valve seat member is situated between s id first and second pole piece means, and wherein said plurality of valving members are each situated between said valve holder and said electrical field coil means and between said valve seat member and said pole piece means.

27. A valving assembly for variably restricting fluid flow, comprising housing means, electrical field coil means for creating a magnetic field flux, wherein said field coil means comprises a cross-sectional longitudinal axis, pole piece means, a valve seat, fluid flow passage means formed through said valve seat, a movable valve, armature means, and resilient means normally operatively resiliently urging said valve toward operative seating engagement with said valve seat as to thereby terminate flow of said fluid through said fluid flow passage means, wherein said electrical field coil means upon being energized is effective to create said magnetic field flux and cause said armature means to move said valve in a direction away from said valve seat to thereby permit flow of said fluid through said fluid flow passage means, and wherein as said valve moves in said direction away from said valve seat said valve is moving in a direction generally transverse to said cross-sectional longitudinal axis, wherein said field coil means is of a ring-like configuration having a central axis, wherein said central axis comprises said longitudinal axis, wherein said resilient means comprises a cantilever-like spring arm, wherein said armature means is operatively connected to said spring arm as to have a swingable end, and wherein said movable valve is operatively connected to said armature means at an area thereof which is at least closely situated to said swingable end of said armature means, and further comprising fluid swirl chamber means communicating with said fluid flow passage means downstream thereof, wherein said swirl chamber means comprises an axis extending generally in the direction of flow of said fluid through said swirl chamber means, and wherein said fluid flow passage means is formed as to have an axis of flow therethrough skew to said axis of said swirl chamber.

28. A valving assembly for variably restricting fluid flow; comprising housing means, electrical field coil means for creating a magnetic fluid flux, wherein said field coil means comprises a cross-sectional longitudinal axis, pole piece means, a valve seat, fluid flow passage means formed through said valve seat, a movable valve, armature means, and resilient means normally operatively resiliently urging said valve toward operative seating engagement with said valve seat as to thereby terminate flow of said fluid through said fluid flow passage means, wherein said electrical field coil means upon being energized is effective to create said magnetic field flux and cause said armature means to move said valve in a direction away from said valve seat to thereby permit flow of said fluid through said fluid flow passage means, and wherein as said valve moves in said direction away from said valve seat said valve is moving in a direction generally transverse to said cross-sectional longitudinal axis, wherein said armature means is secured to and carried by said resilient means, wherein said housing means comprises a chamber, wherein said resilient means comprise spring means having first and second spring ends, wherein said armature means is secured to and carried along said first spring end, and further comprising spring holder means, said spring holder means being formed to locate and position said spring means relative thereto, and said spring holder means and said spring means being received within said chamber whereby said spring means is retained in operating position by virtue of being contained between a portion of a wall defining said chamber and said spring holder means, wherein said spring means comprises a spring member formed of flat spring stock and having a swingably deflectable end, wherein said armature means is secured to said spring member as to move in swingable unison with said swingably deflectable end, wherein said spring holder means comprises conduit means for receiving said fluid from an associated source of said fluid and directing said fluid to areas within said housing means for subsequent flow through said fluid flow passage means.

* * * * *